United States Patent
Tamura et al.

(10) Patent No.: US 8,477,210 B2
(45) Date of Patent: Jul. 2, 2013

(54) IMAGE PROCESSING DEVICE AND IMAGE PROCESSING METHOD

(75) Inventors: Masashi Tamura, Tokyo (JP); Narihiro Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 202 days.

(21) Appl. No.: 13/126,799

(22) PCT Filed: Jul. 30, 2009

(86) PCT No.: PCT/JP2009/003607
§ 371 (c)(1),
(2), (4) Date: Apr. 29, 2011

(87) PCT Pub. No.: WO2010/058497
PCT Pub. Date: May 27, 2010

(65) Prior Publication Data
US 2011/0205404 A1 Aug. 25, 2011

(30) Foreign Application Priority Data

Nov. 21, 2008 (JP) ................................. 2008-298074

(51) Int. Cl.
*H04N 5/228* (2006.01)
(52) U.S. Cl.
USPC ........................................ 348/222.1; 348/364
(58) Field of Classification Search
USPC .............. 348/222.1, 362, 264–266, 625, 606, 348/678
See application file for complete search history.

(56) References Cited

U.S. PATENT DOCUMENTS

| 5,454,052 | A | 9/1995 | Kojima |
| 5,760,922 | A | 6/1998 | Kojima |
| 6,091,862 | A | 7/2000 | Okisu |
| 2003/0016306 | A1 | 1/2003 | Ogata et al. |
| 2003/0219168 | A1 | 11/2003 | Kawakubo |
| 2004/0246378 | A1 | 12/2004 | Okada et al. |
| 2009/0109296 | A1* | 4/2009 | Kuno et al. ................. 348/222.1 |
| 2011/0141368 | A1* | 6/2011 | Wallace et al. ............... 348/606 |

FOREIGN PATENT DOCUMENTS

| EP | 1 315 367 A2 | 5/2003 |
| EP | 1 860 610 A1 | 11/2007 |
| EP | 2 061 233 A1 | 5/2009 |
| JP | 5-344340 A | 12/1993 |
| JP | 7-170395 A | 7/1995 |
| JP | 7-236147 A | 9/1995 |
| JP | 2001-211388 A | 8/2001 |

(Continued)

OTHER PUBLICATIONS

International Search Report, PCT/JP2009/003607, Sep. 8, 2009.

(Continued)

*Primary Examiner* — Tuan Ho
(74) *Attorney, Agent, or Firm* — Birch, Stewart, Kolasch & Birch, LLP (57) ABSTRACT

An output value calculating unit 5 performs weighting arithmetic operations on a plurality of filter values calculated by a filter value calculating unit 4 by using a feature quantity detected by a feature quantity detecting unit 1, a directional correlation value calculated by a directional correlation value calculating unit 2 and an amplitude level calculated by an amplitude level calculating unit 3, and multiplies a result of the weighting arithmetic operations by a sensitization magnification to create pixel signals of a correctly exposed image.

6 Claims, 6 Drawing Sheets

FOREIGN PATENT DOCUMENTS

| | | |
|---|---|---|
| JP | 2001-224555 A | 8/2001 |
| JP | 2002-64831 A | 2/2002 |
| JP | 2003-8898 A | 1/2003 |
| JP | 2003-69901 A | 3/2003 |
| JP | 2004-289607 A | 10/2004 |
| JP | 2005-65196 A | 3/2005 |
| JP | 2007-174089 A | 7/2007 |
| JP | 2007-312284 A | 11/2007 |
| JP | 2008-72450 A | 3/2008 |
| JP | 2008-172566 A | 7/2008 |
| WO | WO 02/075654 A2 | 9/2002 |
| WO | WO 2005/081542 A1 | 9/2005 |

OTHER PUBLICATIONS

Qi et al., "Identification of Blur Direction from Motion Blurred Images", Chinese Journal of Stereology and Image Analysis, vol. 9, No. 3, Sep. 2004, pp. 183-185.

* cited by examiner

| P00 | | P20 | | P40 |
|---|---|---|---|---|
| | | | | |
| P02 | | P22 | | P42 |
| | | | | |
| P04 | | P24 | | P44 |

FIG.8

| G | Mg | G | Mg | G |
|---|---|---|---|---|
| Ye | Cy | Ye | Cy | Ye |
| G | Mg | G | Mg | G |
| Cy | Ye | Cy | Ye | Cy |
| G | Mg | G | Mg | G |

FIG.9

| Y | Y | Y | Y | Y |
|---|---|---|---|---|
| Y | Y11 | Y21 | Y31 | Y |
| Y | Y12 | Y22 | Y32 | Y |
| Y | Y13 | Y23 | Y33 | Y |
| Y | Y | Y | Y | Y |

IMAGE PROCESSING DEVICE AND IMAGE PROCESSING METHOD

FIELD OF THE INVENTION

The present invention relates to an image processing device for and an image processing method of acquiring a sensitized image having a high resolution.

BACKGROUND OF THE INVENTION

A digital still camera equipped with an image sensor, such as a CCD, typically carries out high-sensitivity image capturing with a raised image signal level by performing a long exposure or electrically amplifying an image signal outputted from the image sensor when making an appropriate exposure under conditions of low illumination, such as at nighttime, without using any flash or the like, for example.

However, because a camera movement or a movement of the object to be photographed easily occurs during which such a digital still camera performs a long exposure, the image capturing environment is subjected to a constraint in many cases, such as a constraint that the digital still camera needs to be fixed to a tripod to shoot the object to be photographed or a constraint that any moving object, such as a human, is not chosen as the object to be photographed.

A further problem is that because the noise mixed into the image signal in the analog circuit of the camera is amplified, together with the image information, at a high amplification factor when carrying out high sensitivity image capturing, the S/N ratio of the image degrades.

To solve this problem, the following patent reference 1 discloses an image processing method of using information about an image captured with a relatively low degree of sensitivity among two images captured with different degrees of sensitivity and different exposure times to remove the noise of the image captured with a relatively high degree of sensitivity.

However, because a camera movement and a movement of the object to be photographed cannot be prevented from occurring while the two images are captured even when this image processing method is used, constraints as mentioned above are still imposed on the image capturing environment.

Furthermore, although a method of using a digital pixel mixing process of adding the signal levels of neighborhood image elements within an image acquired through one image capturing without using a plurality of images to cancel random noise while raising the signal level of the object to be photographed is also used, a problem with this method is that the resolution of the object to be photographed decreases remarkably.

RELATED ART DOCUMENT

Patent reference

Patent reference 1: JP,2007-312284, A (paragraph number [0009] and FIG. 1)

SUMMARY OF THE INVENTION

Because the conventional image processing method is configured as mentioned above, while the noise of an image captured with a relatively high degree of sensitivity can be removed, a camera movement and a movement of the object to be photographed cannot be prevented from occurring while two images are captured. A problem is therefore that many constraints are imposed on the image capturing environment.

The present invention is made in order to solve the above-mentioned problem, and it is therefore an object of the present invention to provide an image processing device and an image processing method which can provide a low-noise correctly exposed image with a high resolution without constraints on the image capturing environment.

An image processing device in accordance with the present invention includes: a feature quantity detecting unit for detecting a feature quantity of an object to be photographed which exists around an aimed pixel in a two-dimensional image; a directional correlation value calculating unit for calculating a directional correlation value of the object to be photographed which exists around the aimed pixel from the feature quantity detected by the feature quantity detecting unit; and a filter value calculating unit for referring to a pixel signal of the aimed pixel and pixel signals of neighboring pixels in a neighborhood of the aimed pixel to calculate a plurality of filter values, and a correctly exposed image creating unit performs weighting arithmetic operations on the plurality of filter values calculated by the filter value calculating unit by using the feature quantity detected by the feature quantity detecting unit and the directional correlation value calculated by the directional correlation value calculating unit, and for multiplying a result of the above-mentioned weighting arithmetic operations by a sensitization magnification to create pixel signals of a correctly exposed image.

In accordance with the present invention, because the image processing device is constructed in such a way that it includes the feature quantity detecting unit for detecting a feature quantity of an object to be photographed which exists around an aimed pixel in a two-dimensional image, the directional correlation value calculating unit for calculating a directional correlation value of the object to be photographed which exists around the aimed pixel from the feature quantity detected by the feature quantity detecting unit, and the filter value calculating unit for referring to a pixel signal of the aimed pixel and pixel signals of neighboring pixels in a neighborhood of the aimed pixel to calculate a plurality of filter values, and the correctly exposed image creating unit performs weighting arithmetic operations on the plurality of filter values calculated by the filter value calculating unit by using the feature quantity detected by the feature quantity detecting unit and the directional correlation value calculated by the directional correlation value calculating unit, and for multiplying a result of the above-mentioned weighting arithmetic operations by a sensitization magnification to create pixel signals of a correctly exposed image, the present invention offers an advantage of being able to provide a high-resolution low-noise correctly exposed image without being restricted by the image capturing environment.

EMBODIMENTS OF THE INVENTION

Hereafter, in order to explain this invention in greater detail, the preferred embodiments of the present invention will be described with reference to the accompanying drawings.
Embodiment 1.

Figure 1:
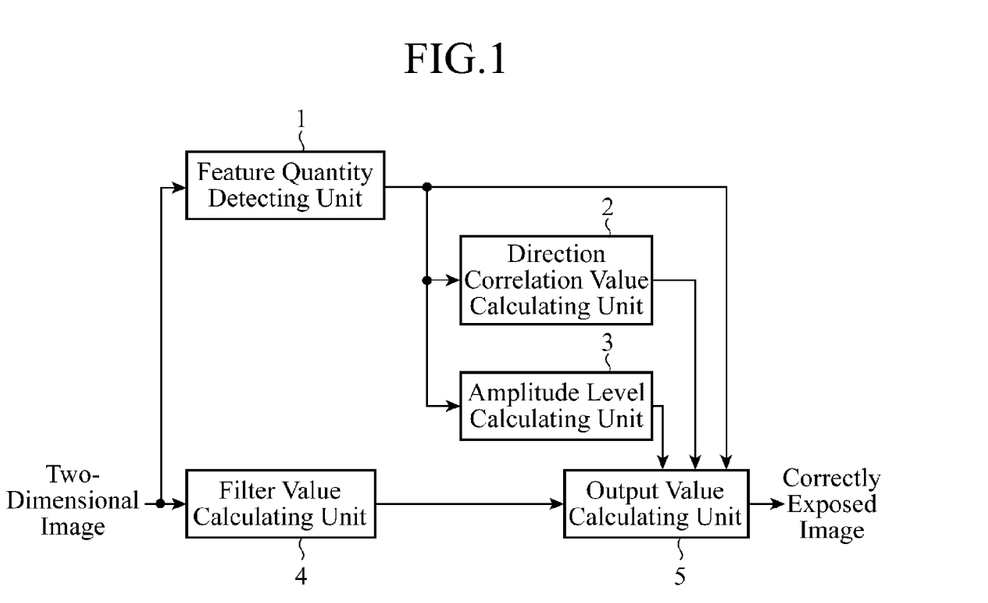
FIG. 1 is a block diagram showing an image processing device in accordance with Embodiment 1 of the present invention.

FIG. 1 is a block diagram showing an image processing device in accordance with Embodiment 1 of the present invention.

In FIG. 1, a feature quantity detecting unit 1 carries out a process of, when receiving a two-dimensional image, detecting a feature quantity of an object to be photographed which exists around an aimed pixel in the two-dimensional image. The feature quantity detecting unit 1 constructs a feature quantity detecting unit.

A directional correlation value calculating unit 2 carries out a process of calculating a directional correlation value of the object to be photographed which exists around the aimed pixel from the feature quantity detected by the feature quantity detecting unit 1. The directional correlation value calculating unit 2 constructs a directional correlation value calculating unit.

An amplitude level calculating unit 3 carries out a process of calculating an amplitude level of the aimed pixel with respect to neighboring pixels (pixels existing around the aimed pixel) from the feature quantity detected by the feature quantity detecting unit 1. The amplitude level calculating unit 3 constructs an amplitude level calculating unit.

A filter value calculating unit 4 carries out a process of referring to a pixel signal of the aimed pixel and pixel signals of the neighboring pixels to calculate a plurality of filter values (e.g., a low pass filter value in a one-dimensional direction including the aimed pixel, a median filter value in a one-dimensional direction including the aimed pixel, a two-dimensional low pass filter value including the aimed pixel, and a two-dimensional median filter value including the aimed pixel). The filter value calculating unit 4 constructs a filter value calculating unit.

An output value calculating unit 5 carries out a process of performing weighting arithmetic operations on the plurality of filter values calculated by the filter value calculating unit 4 by using the feature quantity detected by the feature quantity detecting unit 1, the directional correlation value calculated by the directional correlation value calculating unit 2, and the amplitude level calculated by the amplitude level calculating unit 3, and multiplying the final result of the weighting arithmetic operations by a sensitization magnification to create pixel signals of a correctly exposed image. The output value calculating unit 5 constructs a correctly exposed image creating unit.

Figure 2:
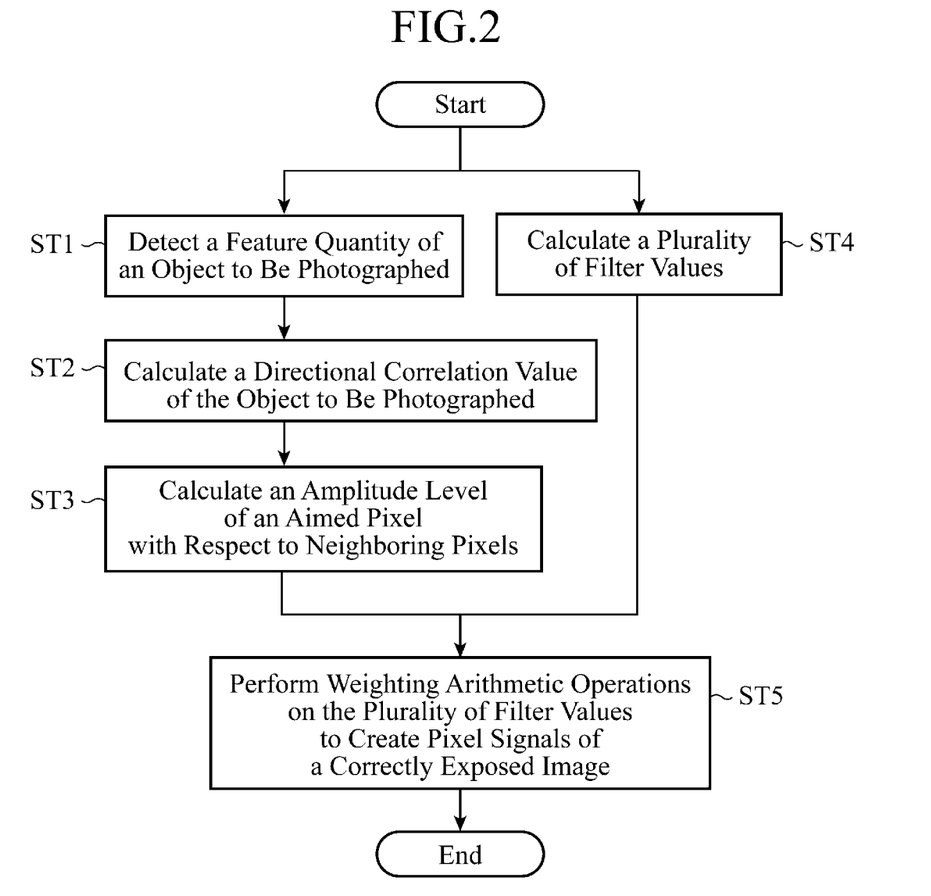
FIG. 2 is a flow chart showing processing carried out by the image processing device in accordance with Embodiment 1 of the present invention.

FIG. 2 is a flow chart showing processing carried out by the image processing device in accordance with Embodiment 1 of the present invention.

Figure 3:
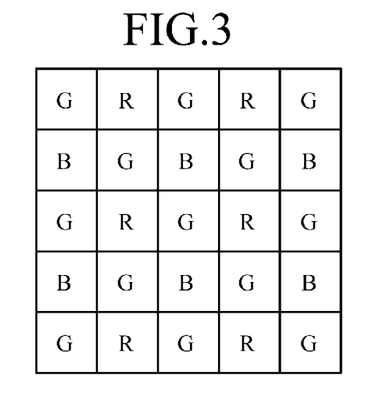
FIG. 3 is a schematic diagram showing a light receiving element group which is a primary color Bayer-type single plate image sensor used typically for a digital still camera.

FIG. 3 is a schematic diagram showing a light receiving element group which is a primary color Bayer-type single plate image sensor used typically for a digital still camera.

In FIG. 3, each square shows one light receiving element, and the light receiving element group arranged in two dimensions carries out photoelectric conversion to capture a two-dimensional image of the object to be photographed.

A unit which uses a single set of this type of two-dimensional light receiving element group is called a single plate image sensor. In order to be able to capture a full color image by using the single two-dimensional light receiving element group, the single two-dimensional light receiving element group has color filters arranged respectively for assigning colors to be photographed to the plurality of light receiving elements.

In the example of FIG. 3, each light receiving element to which a G (green) color filter is attached photographs only a G color, each light receiving element to which a R (red) color filter is attached photographs only a R color, and each light receiving element to which a B (blue) color filter is attached photographs only a B color. The arrangement in which the color filters are arranged as shown in FIG. 3 is called a Bayer array, and is used typically.

Next, the operation of the image processing device will be explained.

In this Embodiment 1, an image is captured by using the primary color Bayer-type single plate image sensor shown in FIG. 3.

In the following explanation, it is assumed that each processing unit carries out a process with a processing window which consists of 5 pixels in horizontal direction ×5 pixels in vertical direction around an aimed pixel.

When receiving a two-dimensional image captured, the feature quantity detecting unit 1 detects a feature quantity of an object to be photographed which exists around an aimed pixel in the two-dimensional image first (step ST1).

Hereafter, the detecting process of detecting a feature quantity which is performed by the feature quantity detecting unit 1 will be explained concretely.

Figure 4:
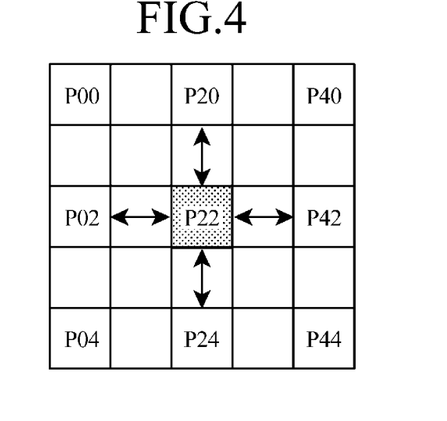
FIG. 4 is an explanatory drawing showing a relationship among image element positions at the time of carrying out a feature quantity detection.

FIG. 4 is an explanatory drawing showing a relationship among image element positions at the time of carrying out the feature quantity detection.

In this Embodiment 1, it is assumed that as to G signals, G of a GR line (referred to as "Gr" from here on) and G of a GB line (referred to as "Gb" from here on) are handled as signals of different colors.

In FIG. 4, "P" shows a pixel having an imaging signal of either one of the R color, the Gr color, the Gb color and the B color.

Furthermore, "P22" is the aimed pixel which is the target for processing, 9 pixels P00, ..., and P44 including P22 have the same color as P22 in the 5×5 window.

The feature quantity detecting unit 1 detects a feature quantity of an object to be photographed which exists around the aimed pixel, as mentioned above. Concretely, as shown in the following equations (1) and (2), the feature quantity detecting unit 1 calculates a horizontal secondary differential value IntH of the aimed pixel and a vertical secondary differential value IntV of the aimed pixel as the feature quantity of the object to be photographed.

$$IntH=|P22-P02|+|P22-P42| \quad (1)$$

$$IntV=|P22-P20|+|P22-P24| \quad (2)$$

For example, in a case in which an edge of the object to be photographed is crossing in a vertical direction when viewed from P22 of FIG. 4, the secondary differential value IntH has a relatively large value while the secondary differential value IntV has a relatively small value.

In contrast with this, in a case in which an edge of the object to be photographed is crossing in a horizontal direction when viewed from P22 of FIG. 4, the secondary differential value IntV has a relatively large value while the secondary differential value IntH has a relatively small value.

After the feature quantity detecting unit 1 calculates the secondary differential values IntH and IntV as the feature quantity, the directional correlation value calculating unit 2 calculates a directional correlation value IntHV of the object to be photographed which exists around the aimed pixel (when the aimed pixel has a high correlation with either one of a pixel in the horizontal direction and that in the vertical direction, an index value showing that the aimed pixel has a high correlation with either one of a pixel in the horizontal direction and that in the vertical direction) by using the secondary differential values IntH and IntV (step ST2), as shown in the following equation (3).

$$IntHV=|IntH-IntV| \quad (3)$$

In the equation (3), because the difference between the secondary differential value IntH and the secondary differential value IntV becomes large when the aimed pixel has a high correlation with either one of a pixel in the horizontal direction and that in the vertical direction, the directional correlation value IntHV becomes a relatively large value.

In contrast with this, when the aimed pixel has the degree of directional correlation with each of both a pixel in the horizontal direction and that in the vertical direction (e.g., when the object to be photographed is positioned in a flat portion which is located not in the vicinity of an edge or when the object to be photographed is at the top of an uneven portion), the directional correlation value IntHV becomes a relatively small value.

After the feature quantity detecting unit 1 calculates the secondary differential values IntH and IntV as the feature quantity, the amplitude level calculating unit 3 calculates an amplitude level DifHV of the aimed pixel with respect to the neighboring pixels (an amplitude index value of a signal level showing what degree of unevenness the aimed pixel has with respect to the neighboring pixels) by using the secondary differential values IntH and IntV (step ST3), as shown in the following equation (4).

$$DifHV=IntH+IntV \quad (4)$$

In the equation (4), because the secondary differential values IntH and IntV are both relatively small when the aimed pixel is positioned in a flat portion which is not located in the vicinity of any edge, the amplitude level DifHV becomes a small value.

In contrast with this, because the secondary differential values IntH and IntV are both relatively large when the aimed pixel is at the top of an uneven portion, the amplitude level DifHV becomes a large value.

The filter value calculating unit 4 refers to the pixel signal of the aimed pixel and the pixel signals of the neighboring pixels to calculate a plurality of filter values (e.g., a low pass filter value in a one-dimensional direction including the aimed pixel, a median filter value in a one-dimensional direction including the aimed pixel, a two-dimensional low pass filter value including the aimed pixel, and a two-dimensional median filter value including the aimed pixel) (step ST4).

Figure 5:
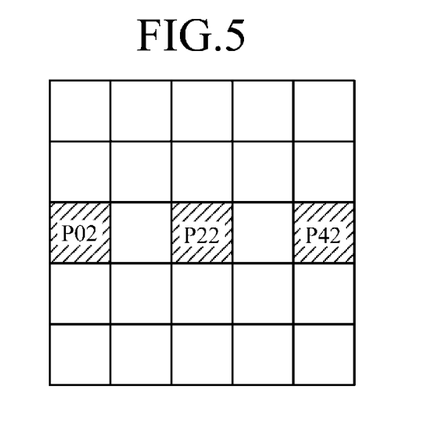
FIG. 5 is an explanatory drawing showing a filter arithmetic operation using an aimed pixel and horizontal three pixels.
Figure 6:
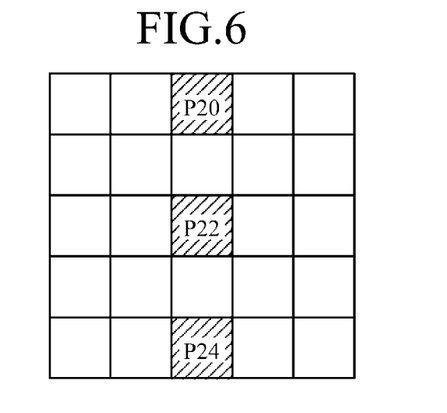
FIG. 6 is an explanatory drawing showing a filter arithmetic operation using the aimed pixel and vertical three pixels.
Figure 7:
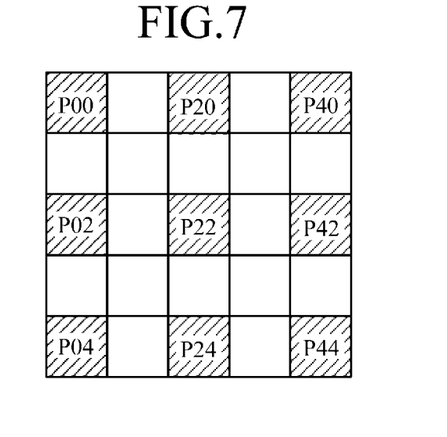
FIG. 7 is an explanatory drawing showing a filter arithmetic operation using nine pixels including the aimed pixel.

More specifically, the filter value calculating unit 4 carries out filter arithmetic operations using the horizontal 3 pixels shown in FIG. 5 including the aimed pixel, filter arithmetic operations using the vertical 3 pixels shown in FIG. 6 including the aimed pixel, and filter arithmetic operations using the 9 pixels shown in FIG. 7 including the aimed pixel.

In performing the filter arithmetic operations in the horizontal direction of FIG. 5 among these filter arithmetic operations, the filter value calculating unit calculates a low pass filter value lpf000 by using the following equation (5), and also calculates a 3-pixel median filter value med000 by using the following equation (6).

$$lpf000=(P22+P02+P42)/3 \quad (5)$$

$$med000=[\text{the median value of P22, P02, and P42}] \quad (6)$$

Furthermore, in performing the filter arithmetic operations in the vertical direction of FIG. 6 among the filter arithmetic operations, the filter value calculating unit calculates a low pass filter value lpf090 by using the following equation (7), and also calculates a 3-pixel median filter value med090 by using the following equation (8).

$$lpf090=(P22+P20+P24)/3 \quad (7)$$

$$med090=[\text{the median value of P22, P20, and P24}] \quad (8)$$

Furthermore, in performing the filter arithmetic operations shown in FIG. 7 among the filter arithmetic operations, the filter value calculating unit calculates a low pass filter value Alpf by using the following equation (9) and also calculates a median filter value Amed by using the following equation (10).

$$Alpf=(P22+P00+P20+P40+P02+P42+P04+P24+P44)/9 \quad (9)$$

$$Amed=[\text{the median value of P22,P00,P20,P40,P02, P42, P04,P24,and P44}] \quad (10)$$

The output value calculating unit 5 performs weighting arithmetic operations on the plurality of filter values calculated by the filter value calculating unit 4 by using the secondary differential values IntH and IntV, which are the feature quantity detected by the feature quantity detecting unit 1, the directional correlation value IntHV calculated by the directional correlation value calculating unit 2, and the amplitude level DifHV calculated by the amplitude level calculating unit 3 and multiplies the final result of the weighting arithmetic operations by a sensitization magnification DGain to create pixel signals Out of a correctly exposed image (step ST5).

Hereafter, the process of creating the pixel signals Out of the correctly exposed image which is carried out by the output value calculating unit 5 will be explained concretely.

First, the output value calculating unit 5 performs weighting addition on the low pass filter value and the median filter value for each direction by using amplitude level DifHV calculated by the amplitude level calculating unit 3.

The following equation (11) shows the weighting addition performed on the horizontal low pass filter value and the horizontal median filter value which correspond to FIG. 5, and the following equation (12) shows the weighting addition performed on the vertical low pass filter value and the vertical median filter value which correspond to FIG. 6.

Furthermore, the following equation (13) shows the weighting addition performed on the low pass filter value and the median filter value which correspond to FIG. 7.

In the equations (11) to (13), Diflimit shows a maximum which the amplitude level DifHV can have, and is a fixed value which is set up in advance.

Furthermore, it is assumed that the amplitude level DifHV is subjected to a limiting process according to the Diflimit value in advance.

$$dlpf000=\{DifHV \times med000+(Diflimit-DifHV) \times lpf000\}/Diflimit \quad (11)$$

$$dlpf090=\{DifHV \times med090+(Diflimit-DifHV) \times lpf090\}/Diflimit \quad (12)$$

$$Alpf2=\{DifHV \times Amed+(Diflimit-DifHV) \times Alpf\}/Diflimit \quad (13)$$

By performing the calculations according to the equations (11) to (13), when the aimed pixel has a larger amplitude than the neighboring pixels, the output value calculating unit 5 can increase the weight of the median filter value. Therefore, when the aimed pixel is isolated point noise, the output value calculating unit can easily remove the isolated point noise.

Furthermore, when the aimed pixel has the same amplitude as the neighboring pixels and its amplitude is small, the output value calculating unit can increase the weight of the low pass filter value, and can therefore enhance an image smoothing effect.

Next, the output value calculating unit 5 performs weighting addition on the filter value in each direction according to the secondary differential values IntH and IntV each of which is a feature quantity detected by the feature quantity detecting unit 1, as shown in the following equation (14).

$$Dlpf=(IntV \times dlpf000+IntH \times dlpf090)/DifHV \quad (14)$$

When the aimed pixel is on a vertical edge, the weight of the filter value dlpf090 in the vertical direction becomes large in Dlpf shown by the equation (14) because the secondary differential value IntH is large and the secondary differential value IntV is small.

In contrast, when the aimed pixel is on a horizontal edge, the weight of the filter value dlpf000 in the horizontal direction becomes large in Dlpf because the secondary differential value IntV is large and the secondary differential value IntH is small.

Next, the output value calculating unit 5 carries out weighting addition of Dlpf, to which a heavier weight has been assigned with respect to the horizontal or vertical direction, and Alpf2 which is uniform in the region by using the directional correlation value IntHV calculated by the directional correlation value calculating unit 2, as shown in the following equation (15), to calculate the pixel signals Out of the correctly exposed image which are a final output value.

$$Out=\{IntHV \times Dlpf+(Intlimit-IntHV) \times Alpf2\} \times DGain/Intlimit \quad (15)$$

In this equation (15), Intlimit shows a maximum which the directional correlation value IntHV can have, and is a fixed value which is set up in advance.

Furthermore, it is assumed that the directional correlation value IntHV is subjected to a limiting process according to the Intlimit value in advance.

In addition, DGain shows the sensitization magnification which is used to carry out digital sensitization.

It can be seen from the equation (15) that when the directional correlation is low, a heavier weight is assigned to the filter value Alpf2 which is uniform in the region, whereas when the directional correlation is high, a heavier weight is assigned to the directivity filter value Dlpf.

As can be seen from the above description, the image processing device in accordance with this Embodiment 1 is constructed in such a way that it includes the feature quantity detecting unit 1 for detecting a feature quantity of an object to be photographed which exists around an aimed pixel in a two-dimensional image, the directional correlation value calculating unit 2 for calculating a directional correlation value of the object to be photographed which exists around the aimed pixel from the feature quantity detected by the feature quantity detecting unit 1, the amplitude level calculating unit 3 for calculating an amplitude level of the aimed pixel with respect to neighboring pixels from the feature quantity detected by the feature quantity detecting unit 1, and the filter value calculating unit 4 for calculating a plurality of filter values with reference to a pixel signal of the aimed pixel and pixel signals of the neighboring pixels, and the output value calculating unit 5 performs weighting arithmetic operations on the plurality of filter values calculated by the filter value calculating unit 4 by using the feature quantity detected by the feature quantity detecting unit 1, the directional correlation value calculated by the directional correlation value calculating unit 2, and the amplitude level calculated by the amplitude level calculating unit 3, and multiplies the final result of the weighting arithmetic operations by a sensitization magnification to create pixel signals of a correctly exposed image. Therefore, this embodiment offers an advantage of being able to provide a high-resolution low-noise correctly exposed image without being restricted by the image capturing environment.

More specifically, because the image processing device in accordance with this Embodiment 1 carries the sensitization process in a single screen, the image processing device becomes possible to carry out the sensitization process without being affected by the influence of a camera movement and a movement of the object to be photographed which occurs in the sensitization process using multiple frames.

Furthermore, because the image processing device calculates the pixel signals of the correctly exposed image by using the filters having a noise reduction effect, such as low pass filters and median filters, the image processing device can carry out the sensitizing process with a low noise level compared with that in a case in which an inputted image having an under exposure is signal-amplified by an analog circuit, and that in a case in which digital data are simply signal-amplified.

Furthermore, because the image processing device detects a feature quantity of an object to be photographed in a small area and calculates a directional correlation value, and then carries out weighting addition of filter values having directivity according to the directional correlation value, the image processing device can acquire a sensitized image having a high resolution compared with that acquired through a conventional pixel mixing process of simply adding the values of neighboring pixels.

In addition, because the image processing device detects a feature quantity of an object to be photographed in a small area and calculates the amplitude level of an aimed pixel, and then carries out weighting addition of a low pass filter value and a median filter value according to the amplitude level, the image processing device can acquire a sensitized image having high quality in which fluctuations caused by the noise of a flat tone portion are suppressed while random noise is removed from the image.

Furthermore, because the image processing device detects a feature quantity of an object to be photographed in a small area and calculates various weighting factors for weighting addition from the feature quantity, and then carries out weighting addition of the plurality of filter values, the image processing device can vary the filters applied to the sensitization process seamlessly. Therefore, the image processing device has a feature of making it difficult for image quality degradation resulting from a sudden change per pixel in the texture of the image to occur compared with a case in which the filters applied to the sensitization process are changed according to the results of the detection of features from an area.

Embodiment 2.

In above-mentioned Embodiment 1, the example in which a two-dimensional image captured by using the primary color system Bayer-type single plate image sensor shown in FIG. 3 is inputted into the image processing device is shown. As an alternative, a two-dimensional image captured by using another image sensor can be inputted into the image processing device.

In a case in which the type of the image sensor applied to the image processing device differs in this way, the arithmetic operation performed by the feature quantity detecting unit 1 and that performed by the filter value calculating unit 4 change to some extent.

Figure 8:
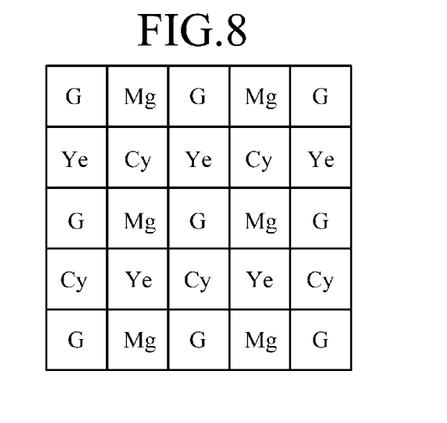
FIG. 8 is an explanatory drawing schematically showing an arrangement of light receiving elements and color filters of a representative complementary color system image sensor.

FIG. 8 is an explanatory drawing schematically showing an arrangement of light receiving elements and color filters of a representative complementary color system image sensor.

In the complementary color system image sensor, complementary color filters of Ye (yellow), Mg (magenta), and Cy (cyan) are arranged, and G color filter are further arranged for brightness detection.

While only G exhibits an adequate response to brightness in a primary color system sensor, a color filter used for the complementary color system sensor and corresponding to each pixel easily exhibits a response to brightness, and brightness information can be extracted from all pixels. Therefore, the complementary color system sensor has a feature of providing a captured image having a high resolution.

The image processing device in accordance with this Embodiment 2 processes the two-dimensional image which the image processing device has captured by using the complementary color system image sensor by changing a reference pixel position at the time of arithmetic operations after converting the two-dimensional image into a brightness color difference system signal (not shown) in order to process the two-dimensional image while taking advantage of the high resolution performance of the complementary color system image sensor.

Figure 9:
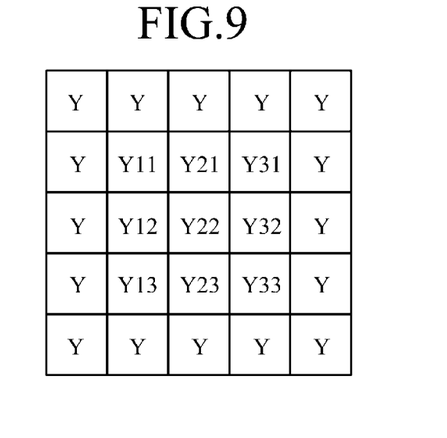
FIG. 9 is a schematic diagram showing a distribution of luminance signals Y of a brightness color difference system signal into which the two-dimensional image of FIG. 8 is converted.

FIG. 9 is a schematic diagram showing a distribution of luminance signals Y of the brightness color difference system signal into which the two-dimensional image shown in FIG. 8 is converted.

The two-dimensional image captured by using the complementary color system image sensor can be converted into the luminance signals Y by using the following equation (16) with 2 pixels in a horizontal direction and 2 pixels in a vertical direction being defined as one unit.

$$Y=Mg+G+Cy+Ye \tag{16}$$

Because the image processing device in accordance with above-mentioned Embodiment 1 carries out the detection of a feature quantity, and the calculation of filter values by using pixels of the same color, the image processing device uses alternate pixels in the two-dimensional image, as shown in FIGS. 4 to 7. In contrast, because the luminance signals are distributed over all the pixels of the complementary color system image sensor, as shown in FIG. 9, the image processing device in accordance with this embodiment differs from that in accordance with above-mentioned Embodiment 1 in that the image processing device in accordance with this embodiment performs arithmetic operations by using pixels Y11 to Y33 arranged close to an aimed pixel Y22.

The equations (1) and (2) are transformed into the following equations (17) and (18) as shown below, for example, and the feature quantity detecting unit 1 calculates secondary differential values IntH and IntV each of which is a feature quantity by using the equations (17) and (18).

$$IntH=|Y22-Y12|+Y22-Y32| \tag{17}$$

$$IntV=|Y22-Y21|+Y22-Y23| \tag{18}$$

The filter value calculating unit 4 calculates low pass filter values and median filter values by using the following equations (19) to (24), for example, instead of the equations (5) to (10).

Figure 10:
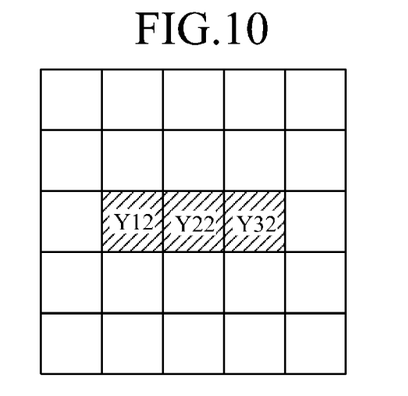
FIG. 10 is an explanatory drawing showing the positions of reference pixels corresponding to filter arithmetic operations given by equations (19) and (20)
Figure 11:
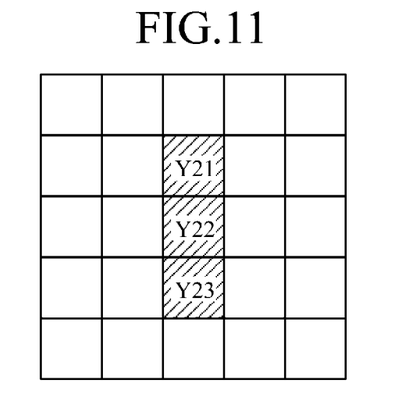
FIG. 11 is an explanatory drawing showing the positions of reference pixels corresponding to filter arithmetic operations given by equations (21) and (22)

FIG. 10 is an explanatory drawing showing the positions of reference pixels corresponding to filter arithmetic operations given by the equations (19) and (20), and FIG. 11 is an explanatory drawing showing the positions of reference pixels corresponding to filter arithmetic operations given by the equations (21) and (22).

Figure 12:
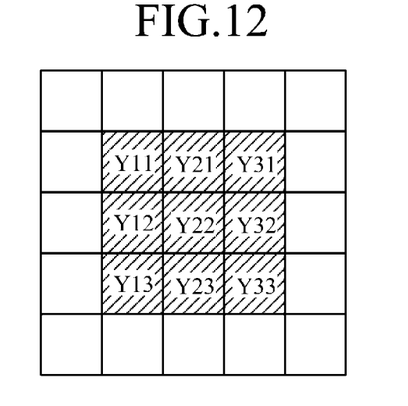
FIG. 12 is an explanatory drawing showing the positions of reference pixels corresponding to filter arithmetic operations given by equations (23) and (24)

Furthermore, FIG. 12 is an explanatory drawing showing the positions of reference pixels corresponding to filter arithmetic operations given by the equations (23) and (24).

$$lpf000=(Y22+Y12+Y32)/3 \tag{19}$$

$$med000=[\text{the median value of Y22, Y12, and Y32}] \tag{20}$$

$$lpf090=(Y22+Y21+Y23)/3 \tag{21}$$

$$med090=[\text{the median value of Y22, Y21, and Y23}] \tag{22}$$

$$Alpf=(Y22+Y11+Y21+Y31+Y12+Y32+Y13+Y23+Y33)/9 \tag{23}$$

$$Amed=[\text{the median value of Y22,Y11,Y21,Y31,Y12, Y32, Y13,Y23,and Y33}] \tag{24}$$

Because feature quantities of any adjacent pixels not including a pixel of the same color cannot be used in the processing performed on the primary color system image sensor, a feature quantity of the object to be photographed cannot be detected appropriately when striped patterns exist at every other pixel of the object to be photographed, for example. In contrast, as shown in this Embodiment 2, because the image processing device can detect feature quantities of pixels including adjacent pixels by processing the captured image by using the complementary color system image sensor, the image processing device can implement the pixel mixing process with a higher resolution.

Embodiment 3.

In above-mentioned Embodiment 1, the example in which Gb and Gr are processed as different colors is shown. As an alternative, Gb and Gr can be processed as the same G color.

Figure 13:
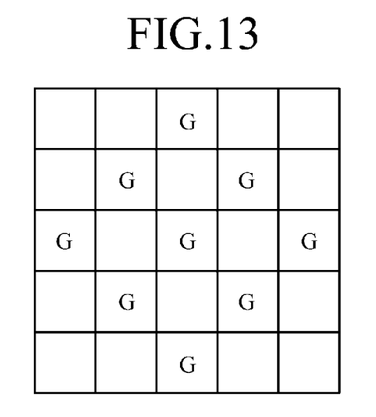
FIG. 13 is an explanatory drawing showing a distribution of available neighboring pixels.

In this case, available neighboring pixels have a distribution as shown in FIG. 13. Therefore, unlike in the case of FIG. 7, pixels diagonally adjacent to an aimed pixel can be used. By thus using pixels diagonally adjacent to an aimed pixel for the detection of feature quantities or the determination of a directional correlation value, the image processing device can implement processing with a higher resolution.

In above-mentioned Embodiments 1 and 2,the image processing device automatically carries out the weighting addition, as shown in the equation (15), of the filter value Dlpf and the filter value Alpf2 according to the directional correlation value IntHV, as shown above. This weighting addition process is only an example, and the image processing device can be alternatively constructed in such a way as to control the process according to a user's choice.

Figure 14:
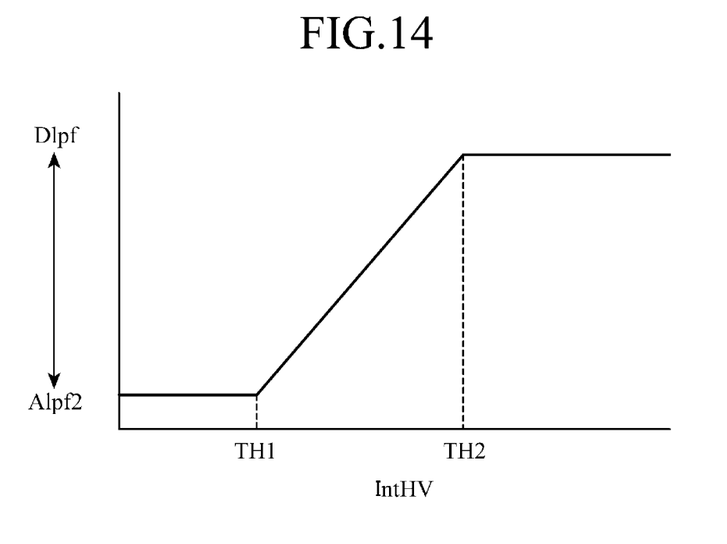
FIG. 14 is an explanatory drawing showing an example of settings of a threshold TH1 and a threshold TH2.

For example, the user can set up a threshold TH1 and a threshold TH2 in advance (refer to FIG. 14), and, when IntHV<=TH1, the image processing device determines the filter value Alpf2 as a final output value Out unconditionally, whereas when IntHV>=TH2, the image processing device determines the filter value Dlpf as the final output value Out unconditionally.

Furthermore, when TH1<IntHV<TH2, the image processing device carries out weighting addition using the directional correlation value IntHV according to the equation (15).

As a result, the image processing device provides an advantage of increasing the flexibility of adjustment of the image quality according to the user's choice.

In above-mentioned Embodiments 1 and 2,the example in which the weighting addition of the filter value Dlpf and the filter value Alpf2 is multiplied by the sensitization magnification DGain in the equation (15) is shown. As an alternative, when performing each of the processes of calculating dlpf000 and dlpf090,and Alpf and Alpf2,the image processing device can multiply the weighting addition by DGain before performing the division.

By thus multiplying the weighting addition by the sensitization magnification DGain before performing the division in each of the equations (9), (11), (12), and (13), the image processing device can include the sensitization magnification DGain in the rounded operation at the time of performing the division. As a result, the image processing device can implement pixel value arithmetic operations with a higher degree of accuracy.

In above-mentioned Embodiments 1 and 2,the image processing device carries out the weighting addition, as shown in the equation (13), of the filter value Amed and the filter value Alpf according to the amplitude level DifHV, as shown above. This weighting addition process is only an example, and the image processing device can be alternatively constructed in such a way as to always use the filter value Alpf as the filter value which is uniform in the region.

In this case, although it becomes difficult to reduce random noise, such as an isolated point, in an area having a low degree of directivity, the image processing device does not have to carry out the arithmetic operations according to the equations (10) and (13). Therefore, when the image processing device is implemented as a circuit, this variant is effective for reduction of the scale of the circuit.

In above-mentioned Embodiments 1 and 2,the image processing device carries out the weighting addition, as shown in the equations (11) and (12), of the median filter value and the low pass filter value according to the amplitude level DifHV, as shown above. This weighting addition process is only an example, and the image processing device can be alternatively constructed in such a way as to enable the user to preset a parameter corresponding to the amplitude level DifHV as a fixed parameter, for example, and fix the weight assigned to the median filter value and that assigned to the low pass filter value.

In this case, the image processing device provides an advantage of enabling the user to freely adjust the image quality. Furthermore, by combining with a structure of not carrying out the weighting addition of the filter value Amed and the filter value Alpf according to the equation (13), the image processing device does not have to calculate the amplitude level DifHV (the amplitude level calculating unit 3 becomes unnecessary). Therefore, when the image processing device is implemented as a circuit, this variant is effective for reduction of the scale of the circuit.

In above-mentioned Embodiments 1 and 2,the image processing device processes a two-dimensional image inputted thereto from the image sensor, as shown above. However, the present invention is not limited to this example. As an alternative, the image processing device can be constructed in such a way as to process only an image in which RGB signals or brightness color difference system signals are provided for each pixel.

More specifically, although the image processing device in accordance with above-mentioned Embodiment 2 carries out the processing after calculating luminance signals for all the pixels, the image processing device can be alternatively constructed in such a way as to carry out the same processing assuming that signals to be processes are provided for all the pixels.

In above-mentioned Embodiments 1 and 2,the feature quantity detecting unit 1 calculates secondary differential values as feature quantities, as shown above. However, the present invention is not limited to this example. In the case of a physical quantity showing the shape of an object to be photographed in an area, the feature quantity detecting unit can calculate primary differential values or a degree of similarity by comparing patterns which are predefined in order to detect a horizontal edge and a vertical edge with the pixel signal values of the area, for example. This variant can provide the same advantages.

Furthermore, in above-mentioned Embodiments 1 and 2,the feature quantity detecting unit 1 detects feature quantities in both the horizontal and vertical directions, as shown above. However, the present invention is not limited to this example. For example, the feature quantity detecting unit can detect feature quantities in diagonal directions by using the pixels P00, P40, P04, and P44 which are located in diagonal directions, as shown in FIG. 4, with respect to the aimed pixel.

In this case, while the amount of arithmetic operation increases, an edge in a diagonal direction can also be reproduced with a high resolution.

INDUSTRIAL APPLICABILITY

The image processing device and the image processing method in accordance with the present invention provide an advantage of being able to acquire a high-resolution low-noise correctly exposed image without being restricted by the image capturing environment. Therefore, the image processing device and the image processing method in accordance with the present invention are suitable for use as an image processing method and an image processing device which acquire a sensitized image having a high resolution, respectively, and so on.

The invention claimed is:

1. An image processing device comprising:
   a feature quantity detecting unit for detecting a feature quantity of an object to be photographed which exists around an aimed pixel in a two-dimensional image;
   a directional correlation value calculating unit for calculating a directional correlation value of the object to be photographed which exists around said aimed pixel from the feature quantity detected by said feature quantity detecting unit;
   a filter value calculating unit for referring to a pixel signal of said aimed pixel and pixel signals of neighboring pixels in a neighborhood of said aimed pixel to calculate a plurality of filter values; and
   a correctly exposed image creating unit for performing weighting arithmetic operations on the plurality of filter values calculated by said filter value calculating unit by using the feature quantity detected by said feature quantity detecting unit and the directional correlation value calculated by said directional correlation value calculating unit, and for multiplying a result of said weighting arithmetic operations by a sensitization magnification to create pixel signals of a correctly exposed image.

2. The image processing device according to claim 1, wherein said image processing device includes an amplitude level calculating unit for calculating an amplitude level of the aimed pixel with respect to the neighboring pixels from the feature quantity detected by the feature quantity detecting unit, and the correctly exposed image creating unit performs the weighting arithmetic operations on the plurality of filter values calculated by the filter value calculating unit by using the feature quantity detected by said feature quantity detecting unit, the directional correlation value calculated by the directional correlation value calculating unit and the amplitude level calculated by said amplitude level calculating unit.

3. The image processing device according to claim 1, wherein the filter value calculating unit calculates a low pass filter value in a one-dimensional direction including the aimed pixel, a median filter value in a one-dimensional direction including said aimed pixel, a two-dimensional low pass filter value including said aimed pixel, and a two-dimensional median filter value including said aimed pixel.

4. The image processing device according to claim 1, wherein the feature quantity detecting unit calculates horizontal and vertical secondary differential values of the aimed pixel as the feature quantity of the object to be photographed.

5. An image processing method comprising:
   a feature quantity detecting step of a feature quantity detecting unit detecting a feature quantity of an object to be photographed which exists around an aimed pixel in a two-dimensional image;
   a directional correlation value calculating step of a directional correlation value calculating unit calculating a directional correlation value of the object to be photographed which exists around said aimed pixel from the feature quantity detected by said feature quantity detecting unit;
   a filter value calculating step of a filter value calculating unit referring to a pixel signal of said aimed pixel and pixel signals of neighboring pixels in a neighborhood of said aimed pixel to calculate a plurality of filter values; and
   a correctly exposed image creating step of a correctly exposed image creating unit performing weighting arithmetic operations on the plurality of filter values calculated by said filter value calculating unit by using the feature quantity detected by said feature quantity detecting unit and the directional correlation value calculated by said directional correlation value calculating unit, and for multiplying a result of said weighting arithmetic operations by a sensitization magnification to create pixel signals of a correctly exposed image.

6. The image processing method according to claim 5, wherein said image processing method includes an amplitude level calculating step of an amplitude level calculating unit calculating an amplitude level of the aimed pixel with respect to the neighboring pixels from the feature quantity detected by the feature quantity detecting unit, and the correctly exposed image creating unit performs the weighting arithmetic operations on the plurality of filter values calculated in the filter value calculating step by using the feature quantity detected by said feature quantity detecting unit, the directional correlation value calculated by the directional correlation value calculating unit and the amplitude level calculated by said amplitude level calculating unit.

* * * * *